(12) United States Patent
Burnett

(10) Patent No.: US 7,042,872 B1
(45) Date of Patent: May 9, 2006

(54) METHOD AND APPARATUS FOR MANAGING REMOTE IP NETWORK ELEMENTS THROUGH SONET NETWORK ELEMENTS

(75) Inventor: Robert Burnett, Raleigh, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/343,517

(22) Filed: Jun. 30, 1999

(51) Int. Cl.
*H04L 12/66* (2006.01)
*H04L 12/24* (2006.01)

(52) U.S. Cl. .................................... 370/355
(58) Field of Classification Search ............. 370/351, 370/352, 353, 354, 355, 357, 389, 392, 395.5, 370/395.51, 395.52, 395.53, 395.54, 404, 370/406, 409, 902, 903, 907
See application file for complete search history.

(56) References Cited

U.S. PATENT DOCUMENTS

| | | | | |
|---|---|---|---|---|
| 5,262,906 A | * | 11/1993 | Mazzola | 370/255 |
| 5,461,624 A | * | 10/1995 | Mazzola | 370/402 |
| 5,537,547 A | * | 7/1996 | Chan et al. | 703/25 |
| 5,539,881 A | * | 7/1996 | Hunt et al. | 703/27 |
| 5,828,403 A | | 10/1998 | DeRodeff et al. | |
| 6,236,660 B1 | | 5/2001 | Alcatel | |
| 2002/0067731 A1 | * | 6/2002 | Houston et al. | 370/401 |

FOREIGN PATENT DOCUMENTS

EP          0 903 959          8/1998

OTHER PUBLICATIONS

Piscitello, D. "Use of ISC CLNP in TUBS Environments". RFC 1561. Dec. 1993. pp. -25.*
Katz et al. "TUBA: Replacing IP with CLNP". IEEE Network. May 1993. pp. 38-47.*
Manchester et al.; IP Over SONET; IEEE Communications Magazine; May 1998; pp. 136-142, vol. 36, No. 5.

* cited by examiner

*Primary Examiner*—Ricky Q. Ngo
*Assistant Examiner*—Derrick W. Ferris
(74) *Attorney, Agent, or Firm*—Sughrue Mion, PLLC; Jessica W. Smith; V. Lawrence Sewell

(57) ABSTRACT

A method and apparatus for transmitting an IP packet between first and second remotely located IP end devices via a network operating under OSI. An IP interface is overlaid over OSI in the routers that are directly connected to the IP devices. These routers act as gateways, communicating with each other using OSI but able to convey IP information to the first and second IP devices via the overlaid IP interface.

3 Claims, 6 Drawing Sheets

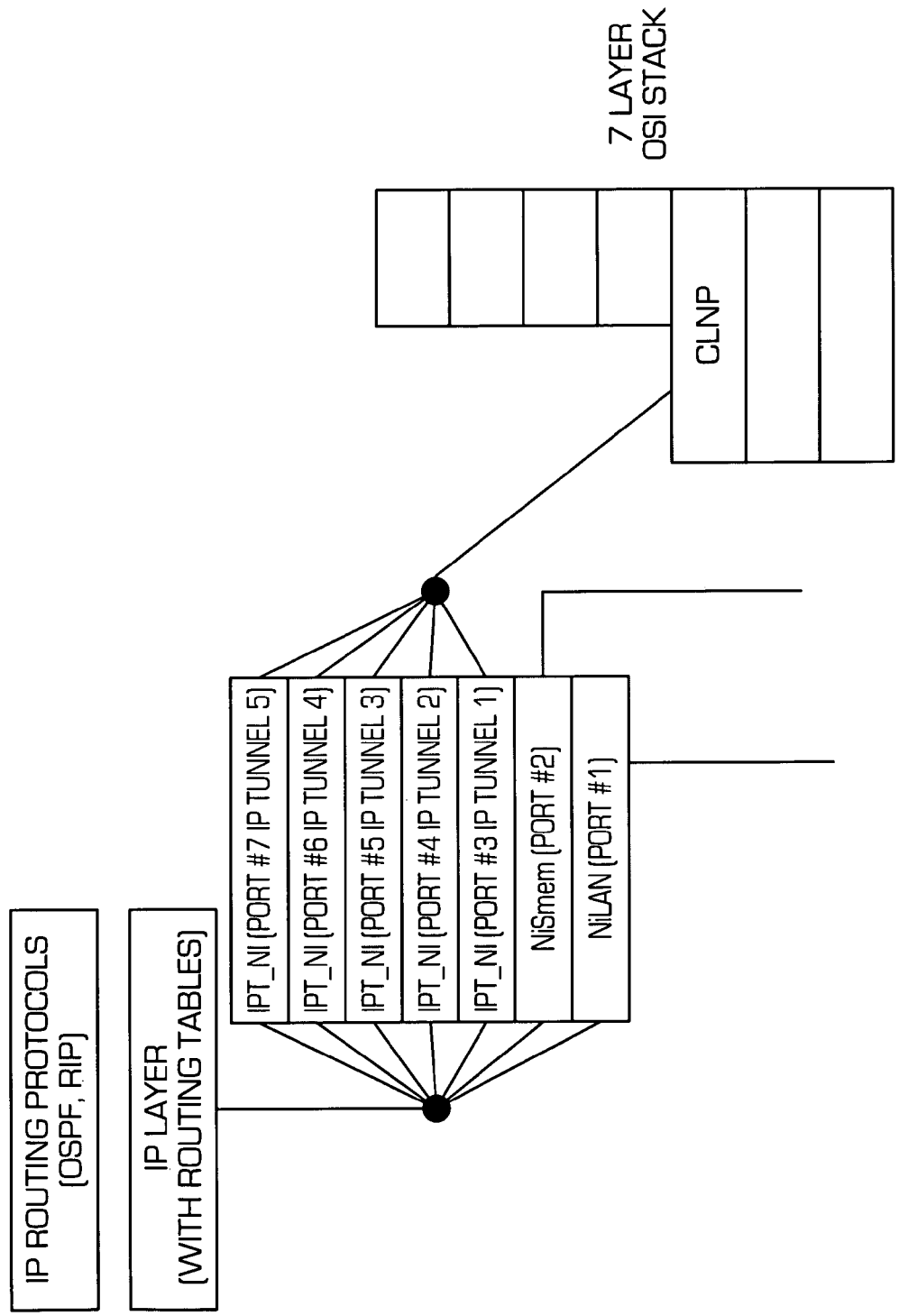

METHOD AND APPARATUS FOR MANAGING REMOTE IP NETWORK ELEMENTS THROUGH SONET NETWORK ELEMENTS

BACKGROUND OF THE INVENTION

Networks of various companies and agencies have the potential to become integrated with a standardized fiber optic plant to promote efficient sharing and transmission of information. However, the array of different protocols used by different bodies hinders interconnectivity and management of data through a common fiber facility.

There is a current need for local and wide area telecommunications networks to connect Internet Protocol (IP) managed Network Elements (NEs) at customer premises with Synchronous Optical NETwork elements (SONET NEs), which are external to the customer premises network and provide a data transport mechanism. As shown in FIG. 1, a SONET NE network including OSI-DCC has the potential to transport data to and from the customer premises where IP NEs $5_1$, $5_2$ and $5_3$ are used to provide the customer a specific interface or service (ISDN, HDLC). These IP NEs ($5_1$, $5_2$ and $5_3$) may need to be managed from an IP manager which is remote from the local customer premises. However, the interconnectivity of remotely located IP NEs, such as those represented by reference numerals $5_1$ through $5_3$, through an intermediate SONET NE 3 to the IP management device 1 has not been previously realized due to fundamental differences in the IP and OSI (used by SONET) protocol stacks.

For instance, the SONET NEs are managed from a central location via Open Systems Interconnect (OSI) applications running on an overhead management channel called the data channel communications (DCC). The customer premises NEs may, however, be IP NEs that are managed by IP applications such as a Simple Network Management Protocol (SNMP). Presently, there is no generic way to manage these remote IP NEs using SNMP through the existing SONET OSI-DCC.

Additionally, at the network layer, SONET runs the CLNP protocol while the IP NE runs the TCP/IP protocol. When a conventional SONET device encounters an IP packet, the SONET device CLNP layer will not be able to route the packet to the IP destination address.

DESCRIPTION OF THE RELATED ART

A first conventional technique to permit interconnection between the customer premise IP NE $5_1$–$5_3$ and a remote IP management device 1 can be provided using a separate network for carrying this management information, using a modem and a dedicated line. This is illustrated in FIG. 2, where the IP management device 1 running SNMP is connected via a leased line 3 to the IP NEs $5_1$–$5_3$ to be managed via modem connections 2, 4. An obvious disadvantage of this first conventional technique is that it requires the use of a dedicated leased line (DSO) and the addition of three extra pieces of equipment (two modems and a terminal server) that must be managed and maintained.

In a second conventional technique to permit management of remotely located IP NEs, management information is embedded in a data path DS1 of one of the remote IP devices. This is illustrated in FIG. 3. For each group of n remote IP NEs ($5_1$ to $5_3$) to be managed, a similar IP NE 2 would be required in the OSI-SONET management office and connected to the management station 1. In this scenario, the IP NEs would provide their own proprietary management channel in band to communicate between the local IP NEs (directly connected the management station) and the remote IP NEs. The second method would require the purchase of additional equipment that must be placed in a central management office where space is a premium, and also reduces the available bandwidth that can be sold to an end user customer.

SUMMARY OF THE INVENTION

The present invention obviates the above deficiencies of the known techniques by tunneling management data and other information to and from remotely located IP NEs via the SONET DCC by placing IP over the Connection Less Network Protocol (CLNP) that is present in OSI.

The placement of IP over CLNP is generic enough to permit pass through management of any IP protocol and is not specific to any vendor. Moreover, because this protocol interfaces at CLNP, IP over CLNP will pass unhindered though the OSI stack on the DCC of legacy SONET NEs or SONET NEs of other vendors that do not have the modification to transmit IP packet information in addition to CLNP datagrams. Thus, the OSI network is not effected by the overlaid IP network. While a few benefits have been described above, additional advantages of the present invention will be apparent to one skilled in the art in view of the following description of a preferred embodiment of the invention with reference to the drawings.

DESCRIPTION OF THE DRAWINGS

FIG. 6 illustrates the interaction between an IP layer overlaid on a CLNP layer according to the preferred embodiment of the invention.

DESCRIPTION OF PREFERRED EMBODIMENT

Figure 1:
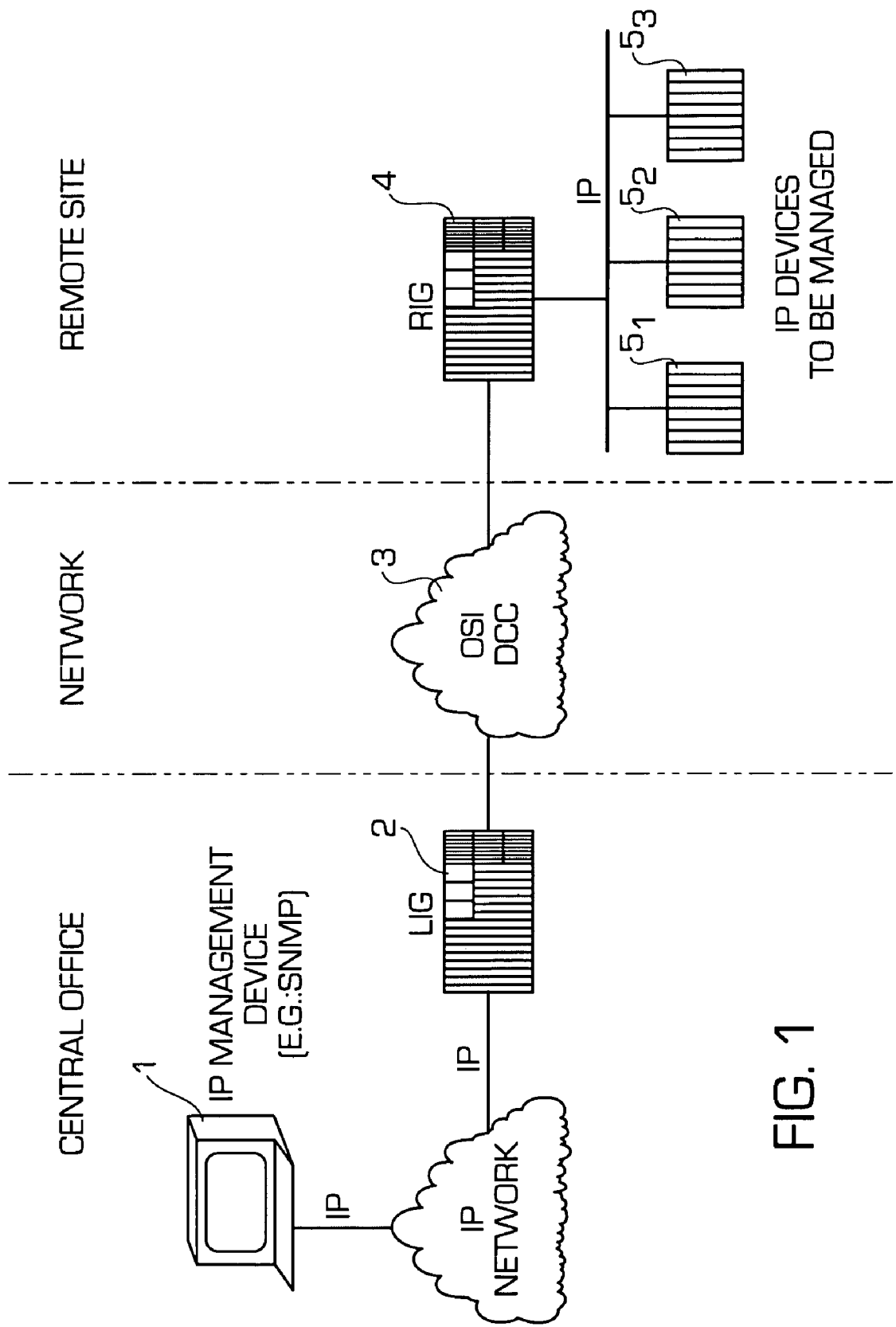
FIG. 1 illustrates remotely located IP devices with an OSI-DCC network disposed therebetween.
Figure 2:
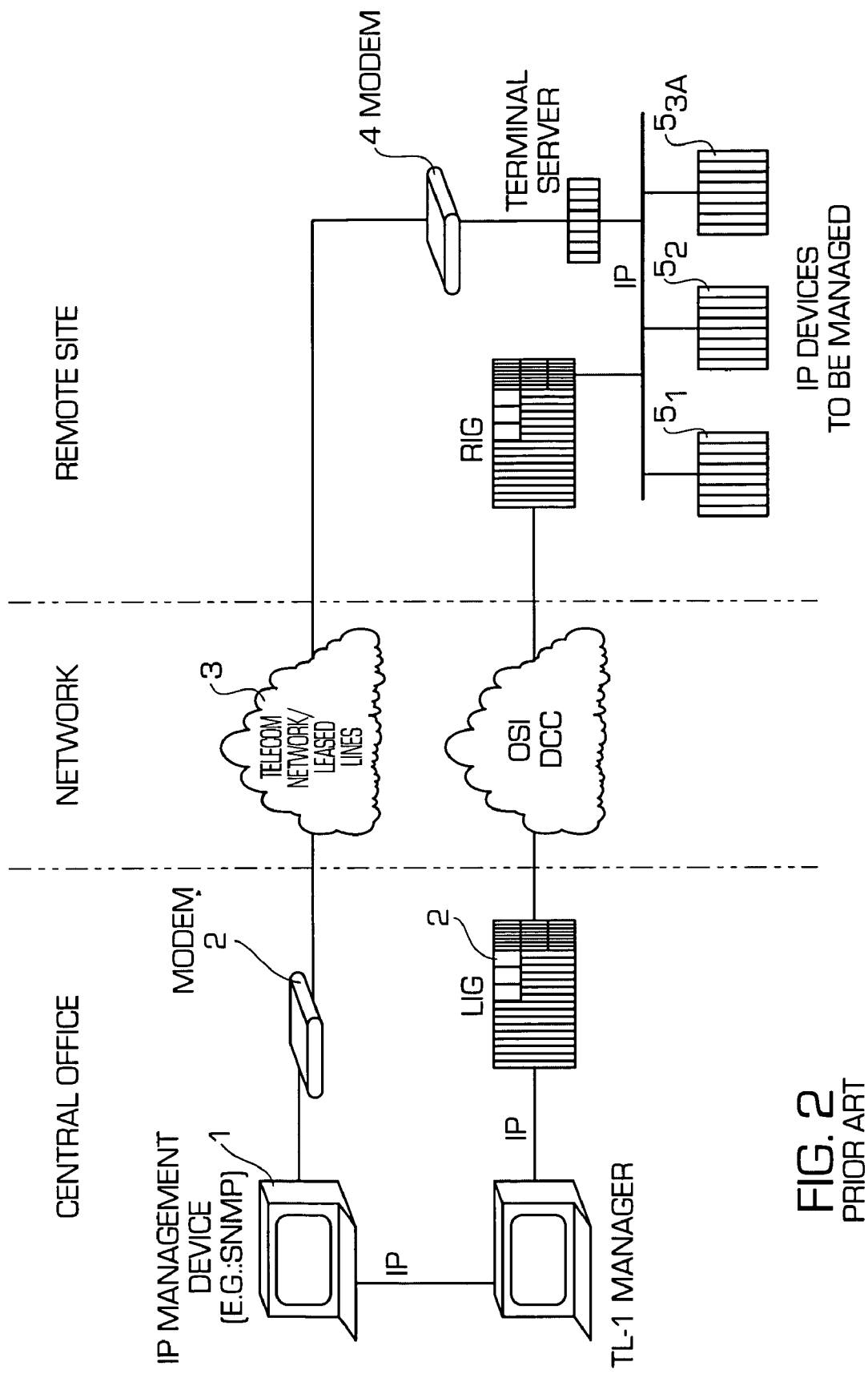
FIG. 2 illustrates a first conventional arrangement for interconnecting remote IP NEs.
Figure 3:
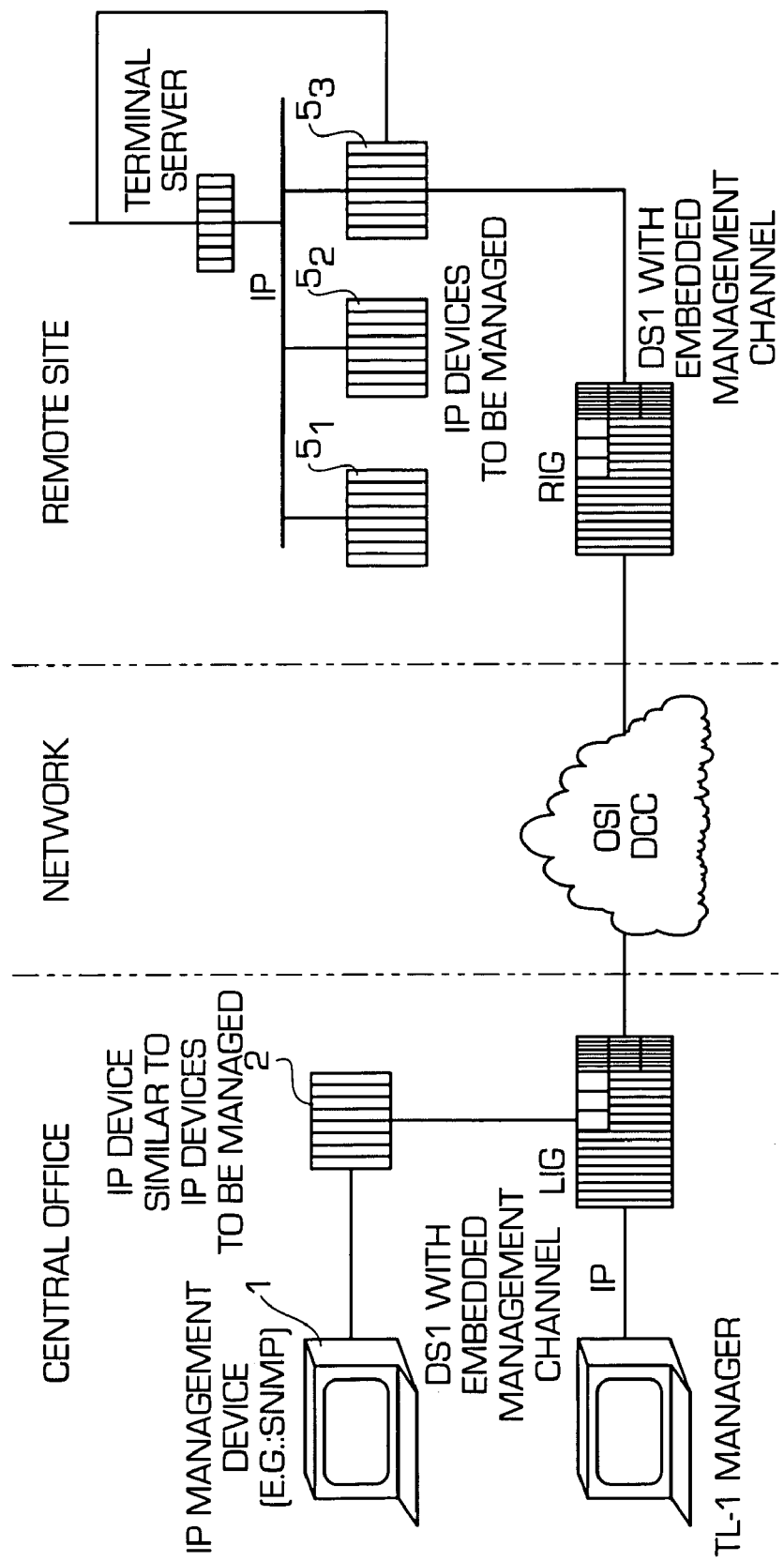
FIG. 3 illustrates a second conventional arrangement for interconnecting remote IP NEs.
Figure 4:
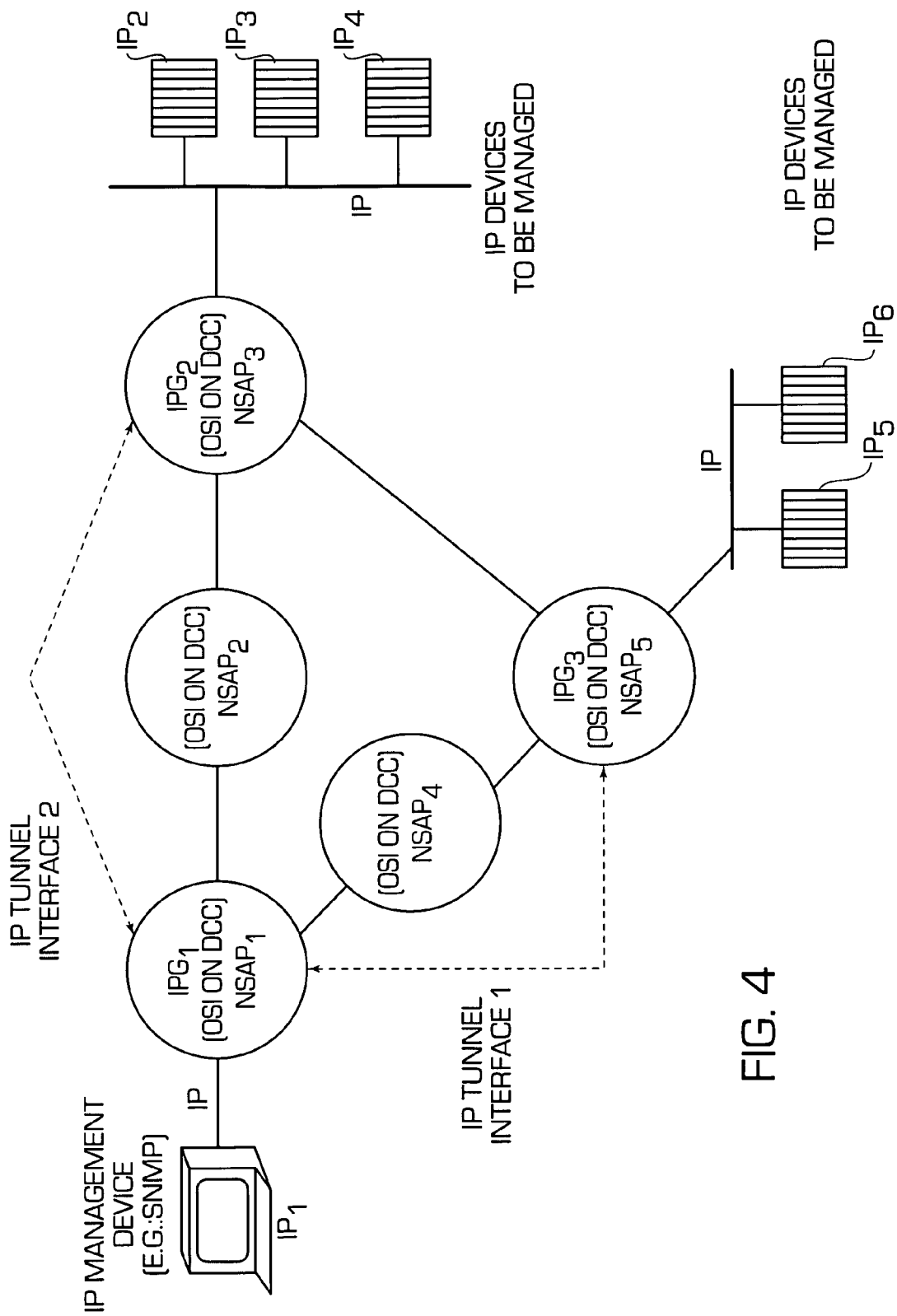
FIG. 4 illustrates the conceptual interconnection between remotely located IP NEs via an OSI NE according to a preferred embodiment of the invention.

Referring to FIG. 4, one or more SONET NEs that are used as routing nodes between remotely located IP NE devices will operate as IP gateways. More particularly, an IP management device $IP_1$ uses the SONET NEs (with OSI DCC) intermediate network elements, designated by NSAP, and $NSAP_3$ as routing nodes to communicate with remotely located IP network elements $IP_2$–$IP_4$ to be managed. Similarly, in order to route IP information from the device $IP_1$ to IP network elements $IP_5$, $IP_6$, the OSI DCC network elements designated by $NSAP_1$ and $NSAP_5$ are used as routing nodes. In FIG. 4, the OSI DCC elements $NSAP_1$, $NSAP_3$ and $NSAP_5$ act as IP gateways and include an IP stack with additional software code to "tunnel" between IPGs. The IP gateway stack permits the OSI DCC device to receive a conventionally formatted IP packet and route it through an IP tunnel over OSI on the DCC to another OSI DCC device which is directly connected with the destination IP device.

The details of how the IP routing tunnels become implemented will be described in greater detail below, in conjunction with FIG. 6.

Figure 5:
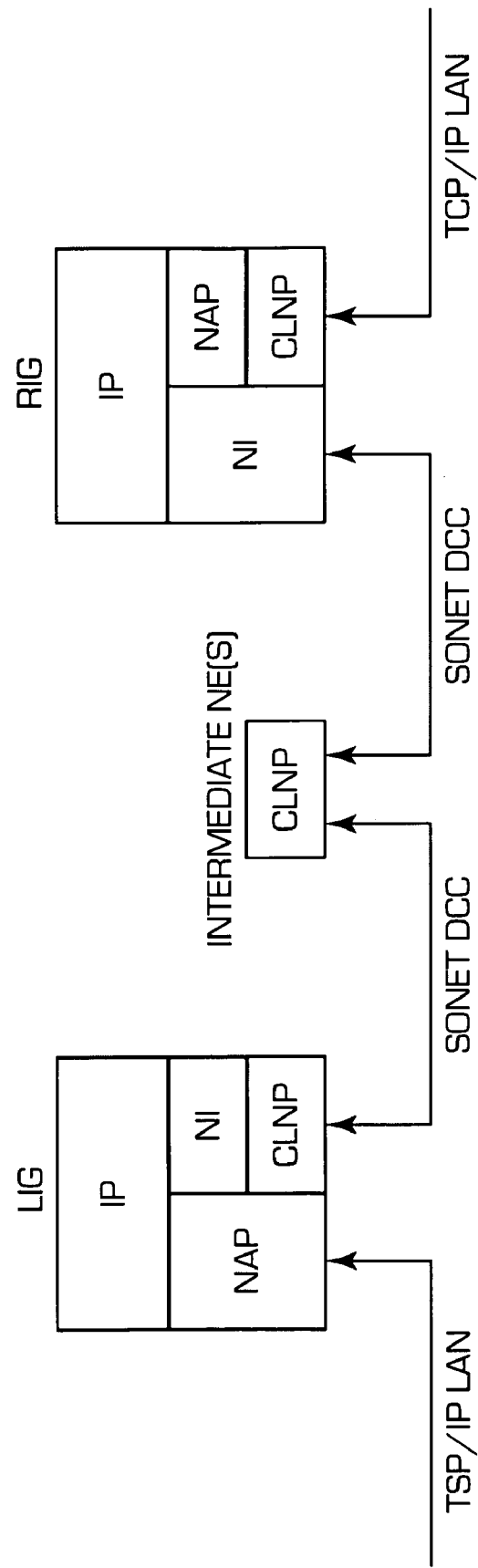
FIG. 5 illustrates the peer to peer communications between layers of the IP gateways and an intermediate SONET NE according to the preferred embodiment.

Referring first to FIG. 5, an IP gateway (such as $IPG_1$, of FIG. 4) receives IP information packets from an IP device via known TCP/IP protocols. The Network Access Protocol (NAP) layer extracts its header and trailer information and passes the IP information to the upper IP layer. These interactions occur according to known interoperations and no additional description is provided. The IP information, including an IP destination address, is used in the network interface (NI) layer according to the present invention. The use of this information permits tunneling to the specific OSI NE which is attached to the IP device with the requested destination address. For purposes of this disclosure, the IPG that initially receives the IP packet will be referred to as the local IP gateway (LIG), and the IPG that delivers the IP packet to the destination IP address will be referred to as the remote IP gateway (RIG).

The LIG achieves tunneling communication with the OSI device RIG that is attached to the destination IP device. The LIG to RIG communication is OSI and the present invention makes use of layer 3 (CLNP) of the seven layer OSI stack. Once the LIG to RIG communication is achieved, the IP stack in the RIG and LIG view this link as just another routable link that is managed by standard IP routing protocols such as OSPF or RIP. This completes the communication between the IP end devices using the OSI devices as intermediate IP gateways. The intermediate NE may include any SONET NE that has OSI running on its DCC.

Notably, the communication at the CLNP layer permits regular operation of any SONET device with OSI on the DCC even if they do not have this tunneling feature. Therefore, the SONET network is transparent to the IP over CLNP protocol implemented by the present invention. Those OSI DCC devices which are called upon to act as IPGs also will make use of a selector field (0xf0) to distinguish the handling of incoming IP and traditional OSI traffic. If an OSI packet is received, then the packet is delivered to the transport layer of the OSI protocol. If an IP packet is received, then the packet is routed to the IP tunneling interface according to the present invention.

FIG. 6 illustrates the interoperations between the IP gateway protocol stack operating as an LIG and the corresponding OSI CLNP layer. In the preferred embodiment, the IP stack of the internet gateways run an open shortest path first routing protocol (OSPF) to configure the network. This permits each IPG to ascertain knowledge about the IP addresses of the IP devices which are directly connected to the respective IPG. The OSPF configuration of the IP devices is done in a conventional manner. In relevant part, the OSPF software associates the IP addresses with a port number. At a bottom layer, a line driver element NILan interfaces with the IP LAN network. (The NiSmem is used for internal communications within the NE.) An internet protocol tunneling layer network interface (IPT_NI) interfaces the IP layer with the CLNP layer in the LIG, which then communicates with a corresponding RIG as will be described in further detail below. Though FIG. 6 shows several IPT_NI tunnels but a connection at only one CLNS interface, each IPT_NI actually tunnels to different SONET OSI devices acting as an RIG. The IP layer may be implemented by a known protocol stack, such as PNA, produced by Integrated Systems, Inc. Similarly, the OSI functions can be implemented by known software using the specific CLNP selector, as previously mentioned in this disclosure.

The network administrator creates an IP tunnel between a LIG and a RIG. This is done by notifying the LIG of the NSAP or TID of the RIGs. Once the link is created, the IP routing protocols (OSPF and/or RIP) running on the LIG and RIG exchange information that allows them to populate their IP routing tables with information about the IP devices connected to each of the other IPGs. For instance, referring back to FIG. 4, $IPG_1$ can facilitate IP communications between $IP_1$ and 1) $IP_2$–$IP_4$ attached to $IPG_2$ and 2) $IP_5$–$IP_6$ attached to $IPG_3$.

At least two tables will be needed to make this possible. The first table (Table 1, below) is used to map IP tunnel numbers to the NSAP of the NE that terminates this tunnel. The network administrator creates the tunnel, or port connection, to a particular NSAP which acts as an IPG. This functionality can be implemented in software. The second table (Table 2, below) is the IP routing table that associates an IP destination address with a specific tunnel, or a port number. This second table is created via an IP routing protocol such as OSPF or RIP. As an exemplary case, in FIG. 6, port number 3 in the IP stack is assigned to receive and transmit information to and from the IPG identified as $NSAP_3$.

EXAMPLE

TABLE 1

| | |
|---|---|
| IPT IF 1 (Port No.3) | $NSAP_3$ |
| IPT IF 2 (Port No.4) | $NSAP_5$ |

TABLE 2

| | |
|---|---|
| $IP_2$, $IP_3$, $IP_4$ | IPT IF 1 (Port No. 3) |
| $IP_5$, $IP_6$ | IPT IF 2 (Port No. 4) |

Together, the first lines of Tables 1 and 2 direct the LIG to transmit an IP packet via IP tunnel 1 to the OSI DCC device uniquely identified by $NSAP_3$ when the IP packet includes one of the IP addresses for $IP_2$–$IP_4$ as a destination address. As previously indicated, the RIG and LIG communicate via CLNP. The RIG receives the IP packet and its own routing table recognizes that $IP_2$, $IP_3$ or $IP_4$ are directly connected to the RIG and routes the packet accordingly via TCP/IP.

Similarly, the second line of table information of Tables 1 and 2 direct the LIG to transmit an IP packet via IP tunnel 2 to the OSI DCC device identified by $NSAP_5$ when the IP packet includes the IP addresses for $IP_5$–$IP_6$ as a destination address. Device $NSAP_5$, acting as an RIG, receives the packet recognizes that $IP_5$ and $IP_6$ are directly connected to the RIG, and routes the packet accordingly.

These tunnels identified as tunnel interfaces 1 and 2 are bi-directional and therefore the OSI DCC devices identified as $NSAP_3$ and $NSAP_5$ will use tunnel interface 1 and tunnel interface 2 respectively to communicate with $IPG_1$. It should be noted however that the tunnel name/number has local significance only and therefore a LIG and RIG may refer to the same logical tunnel by different names/numbers.

It is further noted that no additional tunnel would be required between IPG2 and IPG3 since they can communicate with each other through existing tunnel interfaces 1 and 2. The OSI DCC devices identified by $NSAP_2$ and $NSAP_4$ are not affected by the tunneling interfaces in their operation.

A network administrator or user may provide the table entries for the tunnel interfaces of Table 1, above. Alternatively, this may be programmed as part of the IPT network interface software. An IP tunnel manager (ITM) of the LIG requests network service access points NSAP's for NE's with IPG functionality. This would include intermediate SONET NE's connected to IP end devices. A broadcast request is sent to the NE's with the IP addresses to determine if the network element is operable as an IP gateway. In other words, a message is sent to the network elements to see which ones can support the IP over CNLP association. For those NEs that can support the IP gateway function, a network interface manager (NIM) on the LIG creates network interfaces for each respective NSAP. This network interface corresponds to the table entries as described above.

In addition, a new IPT_NI may be created at the RIG if it receives an IP packet from CLNP and there is no corresponding IPT_NI. This case occurs when the RIG receives an IP packet embedded in the CLNP. The CLNP datagram includes its originating NSAP. If the RIG's routing table does not include a tunnel entry for the received NSAP, then the RIG may assign a port number as a tunnel interface to the originating NSAP address.

While the above provides a description of the preferred embodiment of the invention, the invention is not limited thereto and can be modified by one skilled in the art to reflect the spirit and scope of the appended claims.

What is claimed is:

1. A network element that provides a gateway between a local internet protocol (IP) device and a synchronous optical network to provide remote management of one or more remote IP devices, comprising:

a line driver element that communicates with the local IP device and receives IP packets with a destination address to one or more remote IP devices;

one or more routing tables for providing routing information for IP tunnels through the synchronous optical network to a destination network element with functionality to provide a gateway to the one or more remote IP devices, wherein the one or more routing tables assign network ports in the network element for routing to each of the one or more remote IP devices through the destination network elements;

an internet protocol tunneling layer network interface that translates IP packets received by the network element into a second protocol; and a synchronous optical network port that transmits the translated IP packet over a data communication channel in overhead of synchronous optical frames in the synchronous optical network, wherein the network port was selected in response to the routing tables and destination address of the remote IP device.

2. The network element in claim 1, wherein the second protocol is connection less network protocol (CLNP) and the synchronous optical network is a SONET network.

3. The network element of claim 1, wherein the destination network element with functionality to provide a gateway to the one or more remote IP devices includes a table indicating an IP address for each of the one or more remote IP devices.

* * * * *